US006643645B1

United States Patent
Fayyad et al.

(10) Patent No.: US 6,643,645 B1
(45) Date of Patent: Nov. 4, 2003

(54) RETROFITTING RECOMMENDER SYSTEM FOR ACHIEVING PREDETERMINED PERFORMANCE REQUIREMENTS

(75) Inventors: Usama M. Fayyad, Mercer Island, WA (US); Paul S. Bradley, Seattle, WA (US); Bassel Y. Ojjeh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/500,265

(22) Filed: Feb. 8, 2000

(51) Int. Cl.[7] .................................. G06F 7/00
(52) U.S. Cl. ........................................ 707/6
(58) Field of Search ............... 707/6, 3, 5, 100, 707/102, 101; 705/10; 709/202, 232

(56) References Cited

U.S. PATENT DOCUMENTS

| 5,799,300 | A | * | 8/1998 | Agrawal et al. ............... 707/5 |
| 6,014,661 | A | * | 1/2000 | Ahlberg et al. ............... 707/3 |
| 6,018,738 | A | * | 1/2000 | Breese et al. ............... 707/100 |
| 6,308,175 | B1 | * | 10/2001 | Lang et al. ............... 707/102 |
| 6,374,251 | B1 | * | 4/2002 | Fayyad et al. ............... 707/101 |
| 6,412,012 | B1 | * | 6/2002 | Bieganski et al. ............ 709/232 |
| 6,421,665 | B1 | * | 7/2002 | Brye et al. ................. 707/102 |

OTHER PUBLICATIONS

K.V. Kanth, Divyakant Agrawal and Ambuj Singh Titled Dimentionality Reduction for Similiarity Searching in Dynamic Databases, Copyright ACM 1998 0–89791–995–5/98/006 pp. 166–176.*

Tain Zhang, Raghu Ramakrishnan, Miron Livny Titled Fast Density Estimation Using CF-Kernel for Very Large Databases, Copyright ACM 1999 1–58113–143–7/99/08 pp. 312–316.*

Rakesh Agrawal, Johannes Gehrke, Dimitrios Gunopulos and Prabhakar Raghavan Titiled "Automatic Subspace Clustering of High Dimensional Data for Data Mining Applications" copyright 1998 ACM 0–89791–995–5/98/008 pp. 94–105.*

Breese et al., Empirical Analysis of Predictive Algorithms for Collaborative Filtering, in Proceedings of the 14th Conference on Uncertainty in AI, Madison, WI, Jul. 1998 (Morgan Kaufmann, Publisher).

* cited by examiner

Primary Examiner—Diane D. Mizrahi
Assistant Examiner—Shireen I Solaiman
(74) Attorney, Agent, or Firm—Watts, Hoffmann, Fisher & Heinke, Co. L.P.A.

(57) ABSTRACT

Retrofitting recommender systems, so that they can scale to large data, is disclosed. The principal notion is to reduce data requirements of existing recommender engines by performing a type of data reduction that minimizes the loss of information given the engine. The reductions covered in this invention are designed to be easily implemented on a database system, and are intended to have minimal impact on an existing implementation of a recommender system. In one embodiment, a method repeats reducing the data by a number of records, until an accuracy threshold or a performance requirement is met. If the accuracy threshold is met first, the method repeats removing a highest-frequency dimension from the data, until the performance requirement is also met. The reduced data is provided to the recommender system, which generates predictions based on the reduced data, and a query. Any dimension previously removed from the data is subsequently added back to the predictions, if the dimension is not already part of the query. In other embodiments, clustering of the data and/or the query is also performed as an alternative mechanism for reduction. An associated method for post-processing recommendations to adjust for clustering is also presented.

20 Claims, 6 Drawing Sheets

|     | P1 | P2 | P3 | ... | Pm |
|-----|----|----|----|-----|----|
| U1  | I11 | I12 | I13 |  | I1m |
| U2  | I21 | I22 | I23 |  | I2m |
| U3  | I31 | I32 | I33 |  | I3m |
| ⋮   | ⋮ | ⋮ | ⋮ | 206 |  |
| Un  | In1 | In2 | In3 |  | InM |

RETROFITTING RECOMMENDER SYSTEM FOR ACHIEVING PREDETERMINED PERFORMANCE REQUIREMENTS

FIELD OF THE INVENTION

This invention relates generally to recommender systems, and more particularly to retrofitting such systems so that they can be scaled to applications involving very large databases.

BACKGROUND OF THE INVENTION

Recommender systems, also referred to as predictive or predictor systems, collaborative filtering systems, and document similarity engines, among other terms, typically target determining a set of items, such as products, articles, etc., to match users based on other users' preferences and selections. Usually, a query is stated in terms of what is known about a user, and recommendations are retrieved based on other users' preferences. Generally, a prediction is made based on retrieving the set of users that are similar to a user, and then basing the recommendation on a weighted score of the matches.

Recommender systems have traditionally been based on memory-intensive techniques, where it is assumed the data or a large indexing structure over them is loaded into memory. Such systems, for example, are used by Internet web sites, to predict what products a consumer will purchase, or what web sites a computer user will browse to next. With the increasing popularity of the Internet and electronic commerce, use of recommender systems will likely increase.

A difficulty with recommender systems is, however, that they do not scale well to large databases. Such systems may fail as the size of the data grows, such as the size of an electronic commerce store grows, the inventory grows, the site decides to add more usage data to the prediction data, etc. This results in prohibitively expensive load times, which may cause timeouts and other problems. The response times may also increase as the data increase, such that performance requirements begin to be violated. For these and other reasons, therefore, there is a need for the present invention.

SUMMARY OF THE INVENTION

The invention relates to retrofitting recommender systems, so that they can, for example, scale to voluminous data. The data is generally organized into records (also referred to as rows) and dimensions (also referred to as columns, or items). In one embodiment, a method first repeats reducing the data by a number of records, until a predetermined accuracy threshold or a predetermined performance requirement is met. If the accuracy threshold is met first, then the method repeats removing a highest-frequency dimension from the data, until the performance requirement is also met. The reduced data is provided to the recommender system, which generates predictions based thereon, and also based on a query. Any dimension previously removed from the data is subsequently added back to the predictions produced by the recommender systems, if the dimension is not already part of the query. In other embodiments of the invention, clustering of the data and/or of the query is also performed.

Embodiments of the invention provide for advantages not found within the prior art. Records and/or dimensions are removed from the data to ensure that both accuracy and performance are still met. Thus, even if the size of a database is very large, accurate predictions can still be accomplished, while still maintaining performance. This is attained while not modifying an existing implementation of a recommender system, which may have been very difficult and/or time-consuming to set up, and thus which may not be desirable to change. Rather, embodiments retrofit the recommender system, by adding pre- and/or post-processing around the existing deployed recommender system, by modifying the data that is input to the existing system, and/or modifying the predictions that are output from the existing system.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
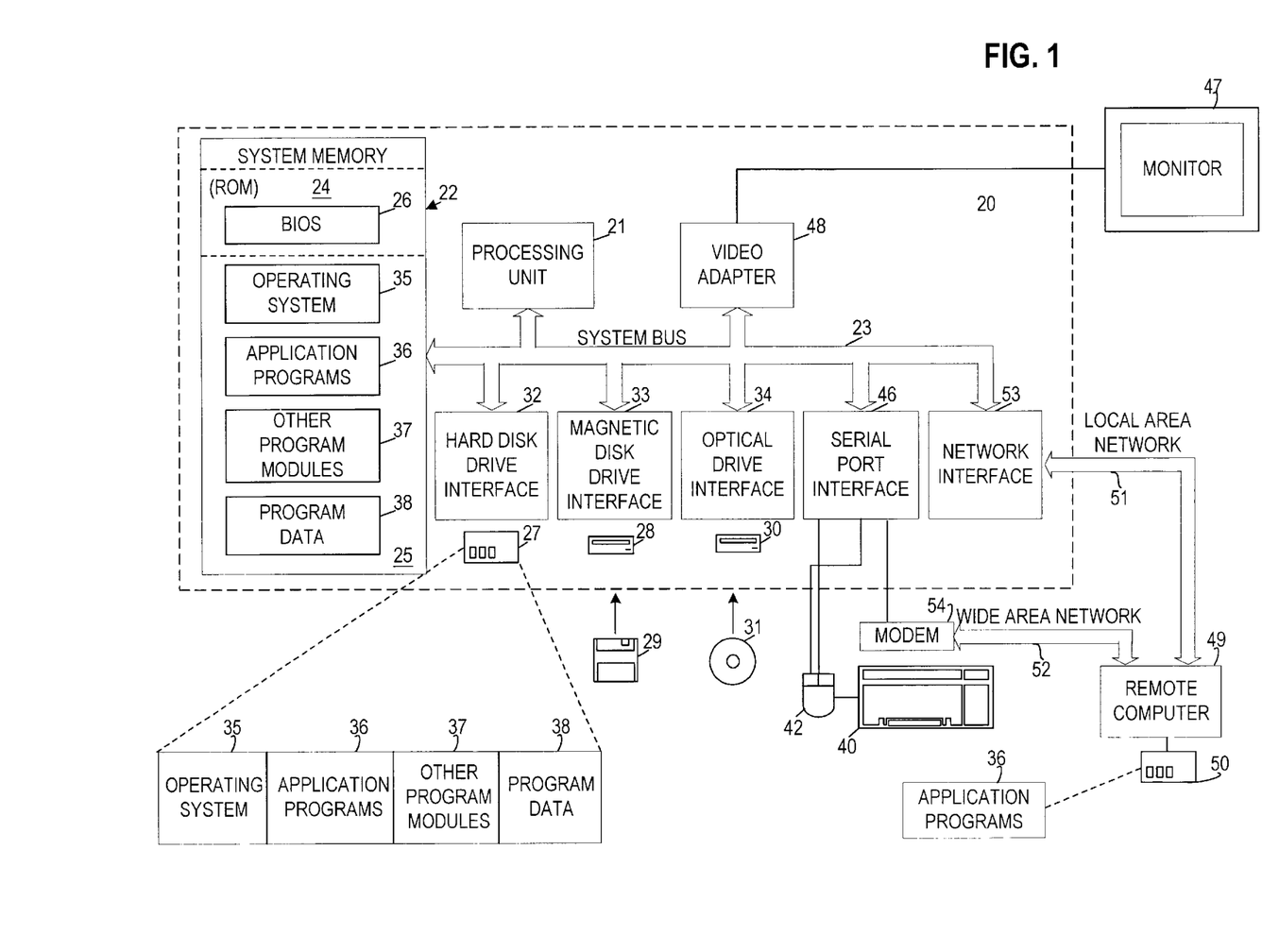
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, ASICs (Application Specific Integrated Circuits), and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, video camera, or the like. These and other input devices are often connected to the processing unit 21 through a serial port interface 46 that is coupled to the system bus, but may be connected by other interfaces, such as a parallel port, game port, an IEEE 1394 port (also known as FireWire), or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Data Organized into Records and Dimensions

In this section of the detailed description, transactional data is described, in conjunction with which embodiments of the invention may be practiced. The transactional binary data is one type of data, organized into records and dimensions, in accordance with which embodiments of the invention may be practiced. It is noted, however, that the invention is not limited to application to transactional binary data. In other embodiments, categorical discrete data, and continuous data, are amenable to embodiments of the invention.

Figure 2:
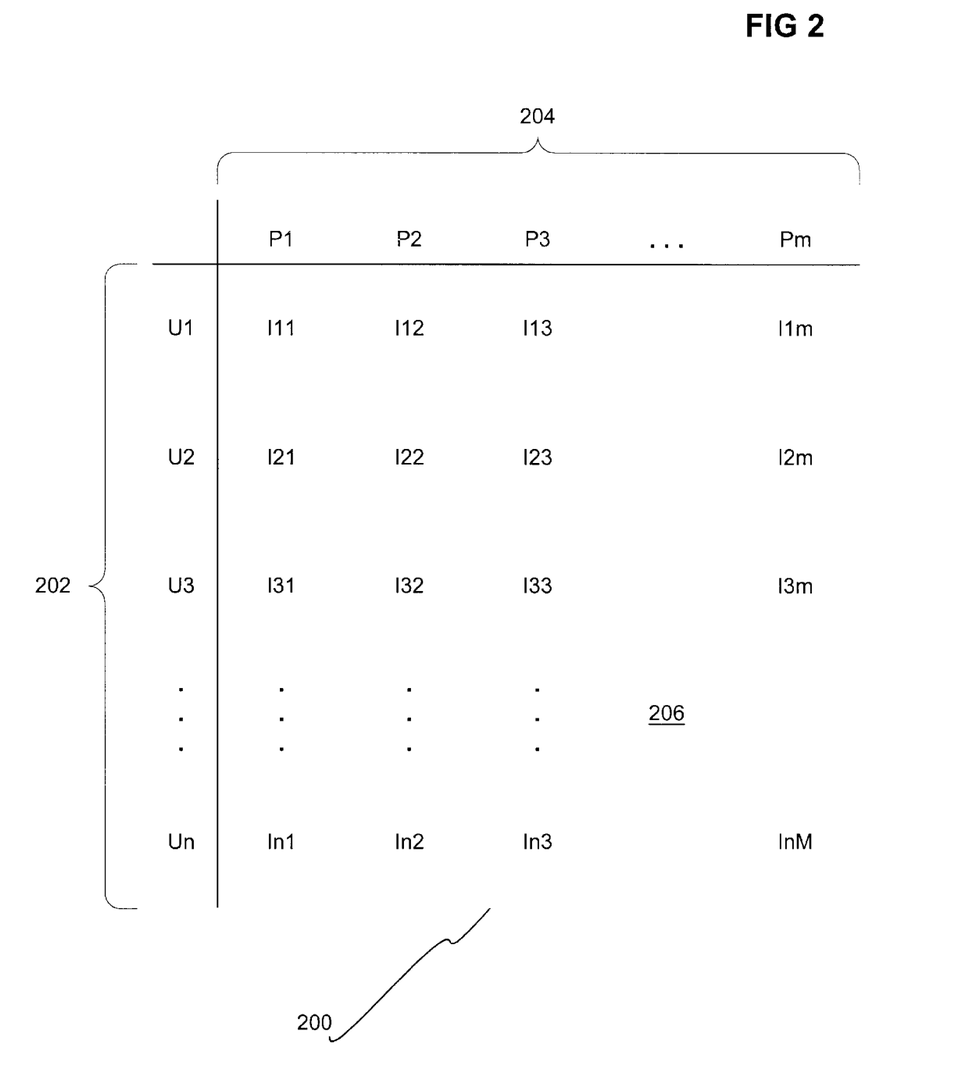
FIG. 2 is a diagram of representative data organized into records and dimensions in accordance with which embodiments of the invention can be practiced.

Referring to FIG. 2, a diagram of transactional binary data in conjunction with which embodiments of the invention may be practiced is shown. The data 206 is organized in a chart 200, with rows 202 and columns 204. Each row, also referred to as a record, in the diagram of FIG. 2 may correspond to a user, for example, users 1 . . . n. Each column, also referred to as a dimension, may corresponds to a product, for example, products 1 . . . m. Each data point within the data 206, also referred to as each item within the data 206, may correspond to whether the user has purchased the particular product, and is a binary value, where 1 corresponds to the user having purchased the particular product, and 0 corresponds to the user not having purchased the particular product. The data is not limited to this example where records are analogous to users and dimensions or columns are analogous to products. Following this example, though, I23 corresponds to whether user 2 has purchased product 3, In2 corresponds to whether user n has purchased item 2, I1$m$ corresponds to whether user 1 has purchased item m, and Inm corresponds to whether user n has purchased item m.

The data 206 is referred to as sparse, because most items have the value 0. In our example, a value of 0 indicates the fact that for any particular user, the user has likely not purchased a given product. The data 206 is binary in that each item can have either the value 0 or the value 1. The data 206 is transactional in that the data was acquired by logging transactions (for example, logging users' purchasing activity over a given period of time). It is noted that the particular correspondence of the rows 202 to users, and of the columns 204 to products, is for representative example purposes only, and does not represent a limitation on the invention itself. For example, the columns 204 in other embodiment could represent web pages that the users have viewed. In general, the rows 202 and the columns 204 can refer to any type of features. The columns 204 are interchangeably referred to herein as dimensions. Furthermore, it is noted that in large databases, the values n for the number of rows 202 could be on the order of hundreds of thousands to hundreds of millions, and m for the number of columns 204 can be on the order of tens of thousands to millions, if not more.

It is further noted that embodiments of the invention are not limited to any particular type of data. In some embodiments, the retrofitting approach is useful for applications including data mining, data analysis in general, data visualization, sampling, indexing, prediction, and compression. Specific applications in data mining including marketing, fraud detection (in credit cards, banking, and telecommunications), customer retention and churn minimization (in all sorts of services including airlines, telecommunication services, internet services, and web information services in general), direct marketing on the web and live marketing in electronic commerce.

Recommender Systems and Retrofitting Them

Figure 3:
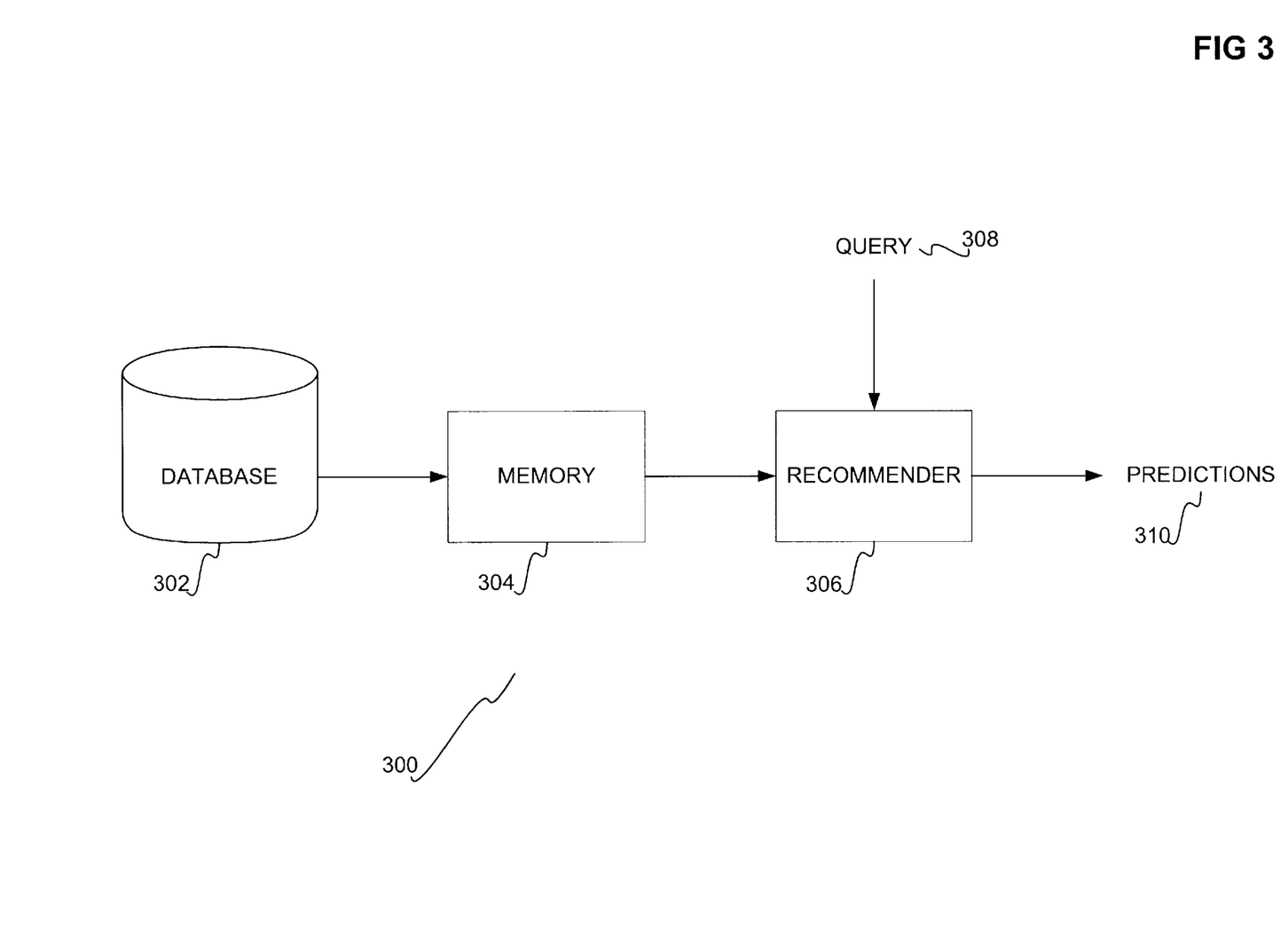
FIG. 3 is a diagram of a representative system including a recommender system in conjunction with which embodiments of the invention can be practiced.

In this section of the detailed description, representative recommender systems in conjunction with which embodiments of the invention may be practiced, and the retrofitting of such systems according to embodiments of the invention, are described. In FIG. 3, a diagram of a recommender system is shown. The system 300 includes a database 302, a memory 304, and a recommender 306. The system 300 in one embodiment can be implemented within an operating environment such as has been described in conjunction with FIG. 1 in a preceding section of the detailed description. Typically and/or frequently, the size of the data within the database 302 is greater than the size of the memory 304.

The recommender system 306 generates or provides predictions 310 based on the query 308 and the data within the database 302, as known within the art. For example, the data can be organized into rows and dimensions, as described in the previous section of the detailed description, such that the query 308 can be likened to another record containing data relating to a number of dimensions, such that the predictions 310 include other dimensions (predicted) based on analyzing the query 308 against the data within the database 302, as is known within the art. For example, where the rows of the data correspond to consumers, and the dimensions of the data correspond to products purchased thereby, the query 308 can correspond to products already purchased by a particular consumer, such that the predictions 310 correspond to other products the consumer is also likely to purchase, based on analysis by the recommender 306 comparing the query 308 to the data within the database 302. The invention is not limited to a particular type or kind of recommender 306, however, as can be appreciated by those of ordinary skill within the art.

Typically and frequently, for the recommender 306 to operate, it must load all the data within the database 302 that it needs for its analysis completely into the memory 304. Thus, as the database 302 grows in size, for the recommender 306 to continue to function properly, the memory 304 must also be increased. However, for very large databases, it is or can be impractical to increase the memory 304, either for cost reasons, and/or because the operating system on which the recommender 306 is running has reached the maximum amount of memory it is able to address. This limits the usefulness of recommenders in voluminous data environments. Furthermore, even if the server hosting the recommender system has enough memory, the response times resulting from lookups into a very large memory can be very prohibitive. Hence, from a performance enhancement perspective, the retrofit methods described in this invention will be very useful.

Figure 4:
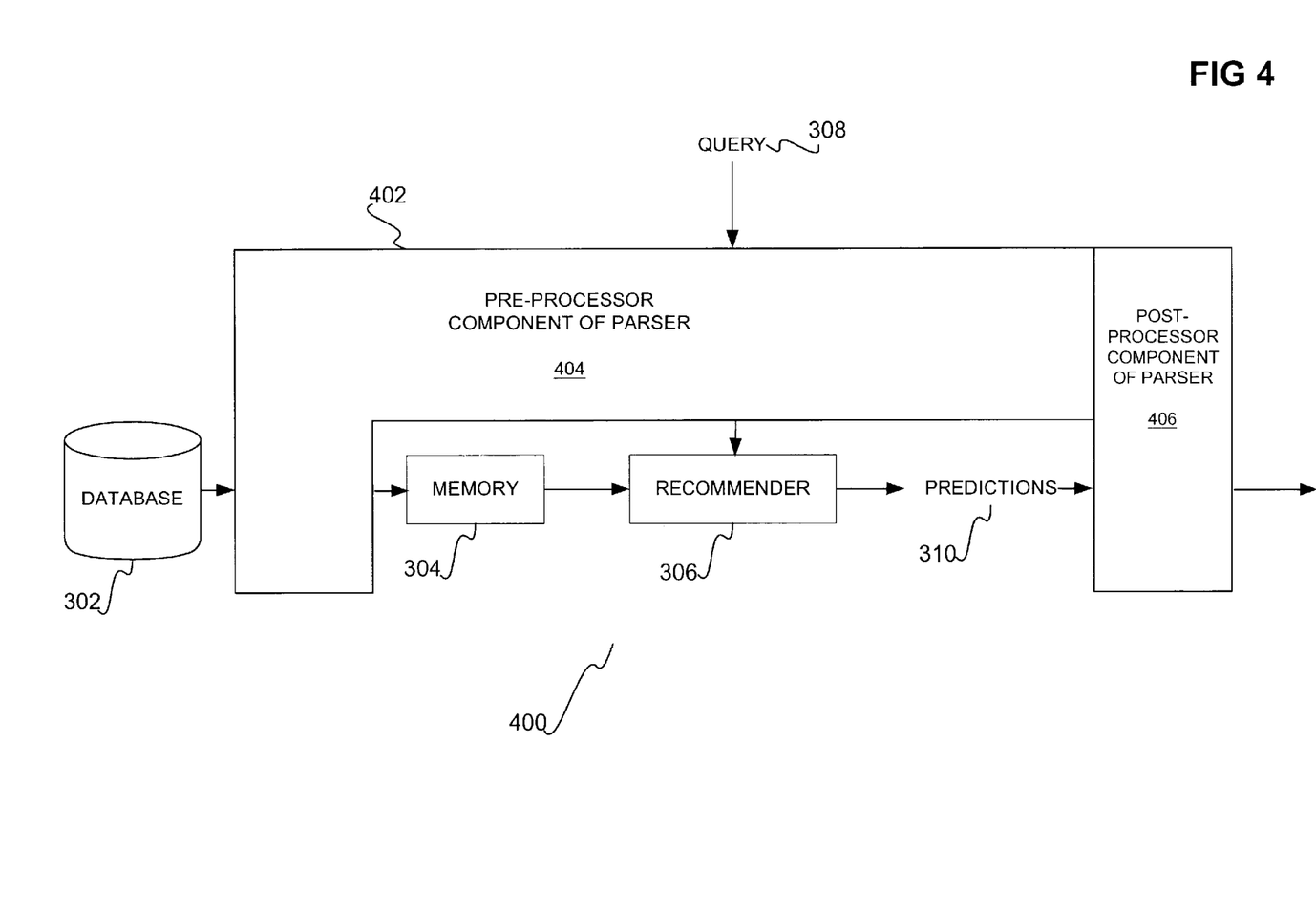
FIG. 4 is a diagram of a computerized system showing a recommender system, such as that of FIG. 3, that has been retrofitted in accordance with an embodiment of the invention.

Therefore, embodiments of the invention retrofit the recommender—non-restrictively meaning that the data, query, and/or predictions are modified at the input or output from the recommender without affecting the internal operation of the recommender itself. Desirably, the recommender itself is not modified. Retrofitting a recommender system according to one embodiment is shown in the diagram of FIG. 4. The system 400 still includes the database 302, the memory 304, and the recommender 306, as before, but also includes a parser 402, to retrofit the recommender 306. The parser 402 includes a pre-processor component 404, and a post-processor component 406. In one embodiment, either or both of the components 404 and 406 comprise a computer program, such as can be executed by a processor from a computer-readable medium.

The pre-processor component 404 is designed to reduce the amount of data from the database 302 that is loaded into the memory 304, and thus that is analyzed by the recommender 306. The un-reduced data, that is, may not be able to be completely loaded into the memory 304, while the reduced data may be able to be. The pre-processor component can in some embodiments be designed to modify the query 308 as well. Desirably, the pre-processor component reduces the data such that both a predetermined accuracy threshold and a predetermined performance requirement, as maybe mandated by the end use for the recommender system, are still met. The accuracy threshold, for example, may determine how accurate the predictions must be, while the performance requirement, for example, may determine how quickly the predictions must be returned by the recommender, although the invention is not limited to either example. By reducing the data, in other words, the pre-processor component 404 can ensure that the recommender 306 is able to scale to large data environments.

The post-processor component 406 in one embodiment is designed to modify the predictions 310 generated by the recommender 306 to account for their being based on reduced data. It is noted that the post-processor component 406 is not required by all embodiments of the invention. Likewise, the pre-processor component 404 is not required to modify the query 308 in all embodiments of the invention. By reducing the data from the database 302 that is required to be loaded into the memory 304, and by optionally modifying the query 308 and/or the predictions 310, the parser 402 thus enables the recommender 306 to be scaled to voluminous data stored within the database 302. That is, as the database 302 becomes larger, the parser 402, for example, may reduce the data more significantly so that it can still be loaded into the memory 304, in one embodiment, so that the recommender 306 is still able to operate quickly and generate accurate predictions. Without the parser 402, the recommender system is not able to scale as well to large or voluminous data.

Retrofitting Recommender Systems: One Embodiment

Figure 5:
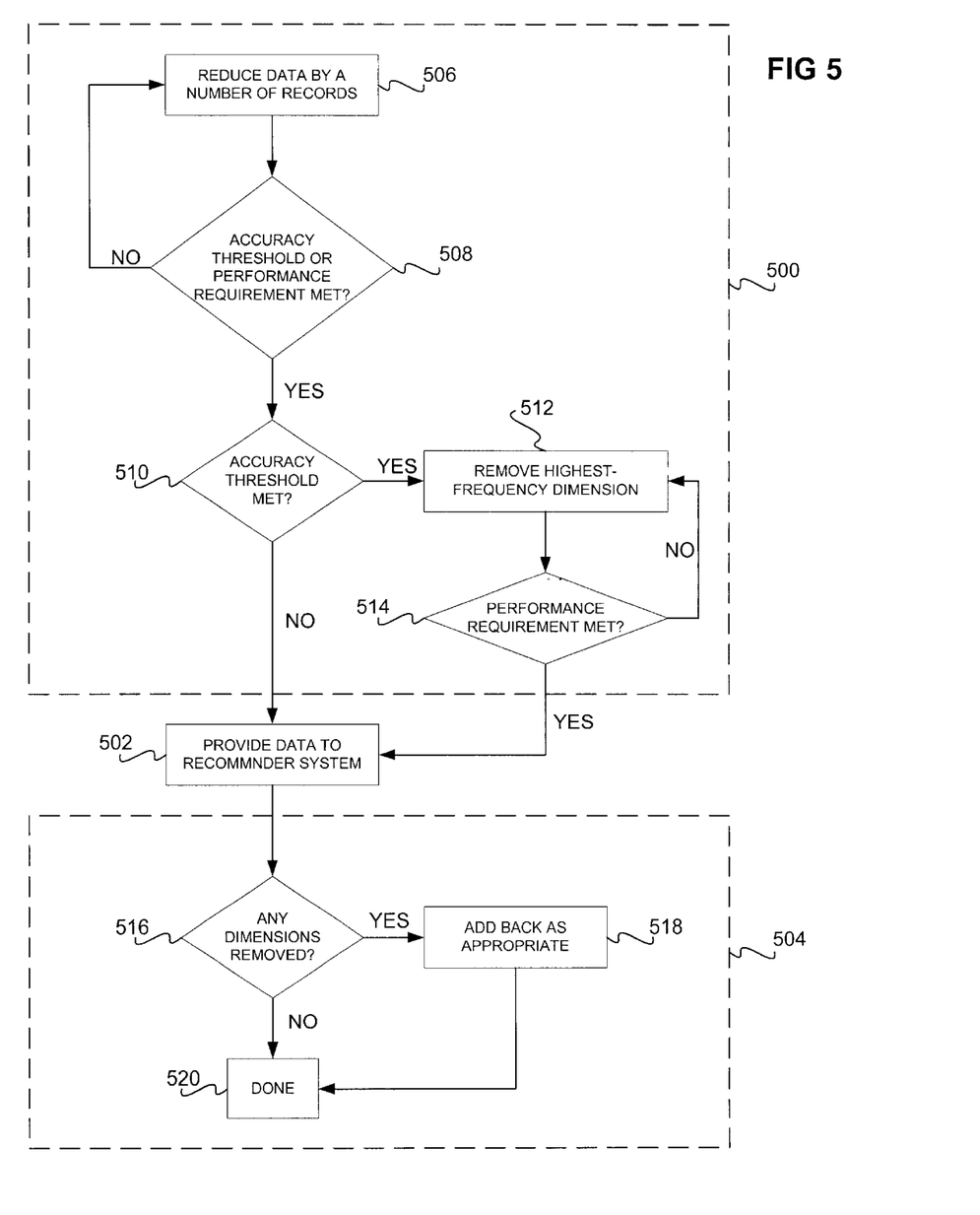
FIG. 5 is a flowchart of a method for retrofitting a recommender system according to one embodiment of the invention; and, FIG. 6 is a flowchart of a method for retrofitting a recommender system according to another embodiment of the invention.

In this section of the detailed description, the manner by which recommender systems are retrofitted in accordance with one embodiment of the invention is described. The invention itself is not particularly limited to this embodiment, however. The embodiment is described as a method, which can be a computer-implemented method, and is shown in the flowchart of FIG. 5, to which reference is made. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Referring now to FIG. 5, the method includes three main parts: 500, 502 and 504. In 500, pre-processing is performed against data in a database, and also optionally against a query. Specifically, the data is reduced such that both a predetermined accuracy threshold and a predetermined performance requirement are met. The invention is not limited to a particular threshold and/or requirement.

In one embodiment, the accuracy threshold is in the form of a scoring function, as can be appreciated by those of ordinary skill within the art, that compares the accuracy of predictions resulting from the data as reduced as compared to predictions resulting from the data itself. If the accuracy drops below a certain threshold—for example, 95%—then it is said that the threshold is met. Once a reduction causes a drop below the threshold, reduction is stopped and the second stage of the algorithm is invoked. If, however, performance requirements are satisfied before the reduction is finished, then the algorithm stops with success. Similarly, the performance requirement in one embodiment is the response time for the recommender system to respond to a query as applied against the data as reduced. For example, such a requirement may specify that the recommender system generate its predictions, or recommendations, within x milliseconds. Such a performance measurement can be encapsulated within another scoring function that measures the performance of a particular recommender system being used. When the data has been reduced sufficiently to meet a certain performance level (e.g., such that responds are within x milliseconds), then it is said that the performance requirement has been met.

In 502, the data is provided to a recommender system, so that the system can generate recommendations based on a query provided thereto as well as on the data as reduced. The recommendations are also referred to as predictions. Where the data is organized into records and dimensions, such that the query comprises effectively another record—a number of dimensions, for example—then the predictions themselves comprise a number of dimensions as well. For example, where the records correspond to users, and the dimensions correspond to individual web sites (erg., a binary yes or no as to whether a given user has visited a particular web site), then a query may be those web sites already visited by a user, such that the predictions are those web sites that the user may also likely visit, too. The invention is not limited to a particular recommender system, as can be appreciated by those of ordinary skill within the art.

Finally, in 504, any post-processing that is necessary to account for the predictions being based on the data as reduced in pre-processing (in 500)—as opposed to the data itself—is performed. Not all embodiments of the invention require such post-processing, however. The pre-processing performed in 500, and the post-processing performed in 504, are now described in more detail, where the pre-processing includes 506, 508, 510, 512 and 514, and the post-processing includes 516, 518 and 520.

In 506, the data is reduced by a predetermined number of records. The number of records is not limited by the invention. Furthermore, the data can be reduced in accordance with any sampling technique known within the art, as can be appreciated by those of ordinary skill within the art. In 508, it is determined if either the accuracy threshold or the performance requirement has been met. If not, this corresponds to the situation where accuracy of the reduced data is still better than necessary as per the threshold, but that performance is still not as good as necessary as per the requirement, such that the method proceeds back to 506, where more records are reduced from the data.

Once either the accuracy threshold or the performance requirement has been met, the method proceeds from 508 to 510, where it is specifically determined whether the accuracy threshold has been met—that is, if removing records from the data has resulted in reduced data that now cannot support the minimum accuracy required. If this occurs, then no more records are desired to be removed from the data; however, the performance needed is still not being met, such that further pre-processing of the data desirably occurs.

Therefore, the method proceeds to 512, where the highest-frequency dimension (defined as the dimension with largest fraction of 1's) is removed from the data, and the performance requirement is tested for in 514. The method proceeds back from 514 to 512—to remove the next-highest-frequency dimension (as defined above) of the data (that is, the highest-frequency dimension of the remaining reduced data)—until at some point the performance requirement is met, at which time the method proceeds from 514 to 502. It is also noted that if the accuracy threshold was originally met—without removing dimensions from the data—then the method also reaches 502 from 510.

In 502, the data as reduced is provided to the recommender system, along with a query, so that the recommender system can generate predictions based thereon. Once the predictions are received, if any dimensions were removed in iterations of 512, then the post-processing must re-add these dimensions to the predictions, if they were not found in the query itself. Therefore, the method proceeds to 516, where if any dimensions were previously removed in 512, the method proceeds to 518, to add them back as appropriate—that is, those dimensions removed in iterations of 512 that are not present in the query itself are added to the predictions based on the frequency of the removed attribute. The method then ends in 520, from either 518, or 516.

Retrofitting Recommender Systems: Cluster-Based Embodiment

Figure 6:
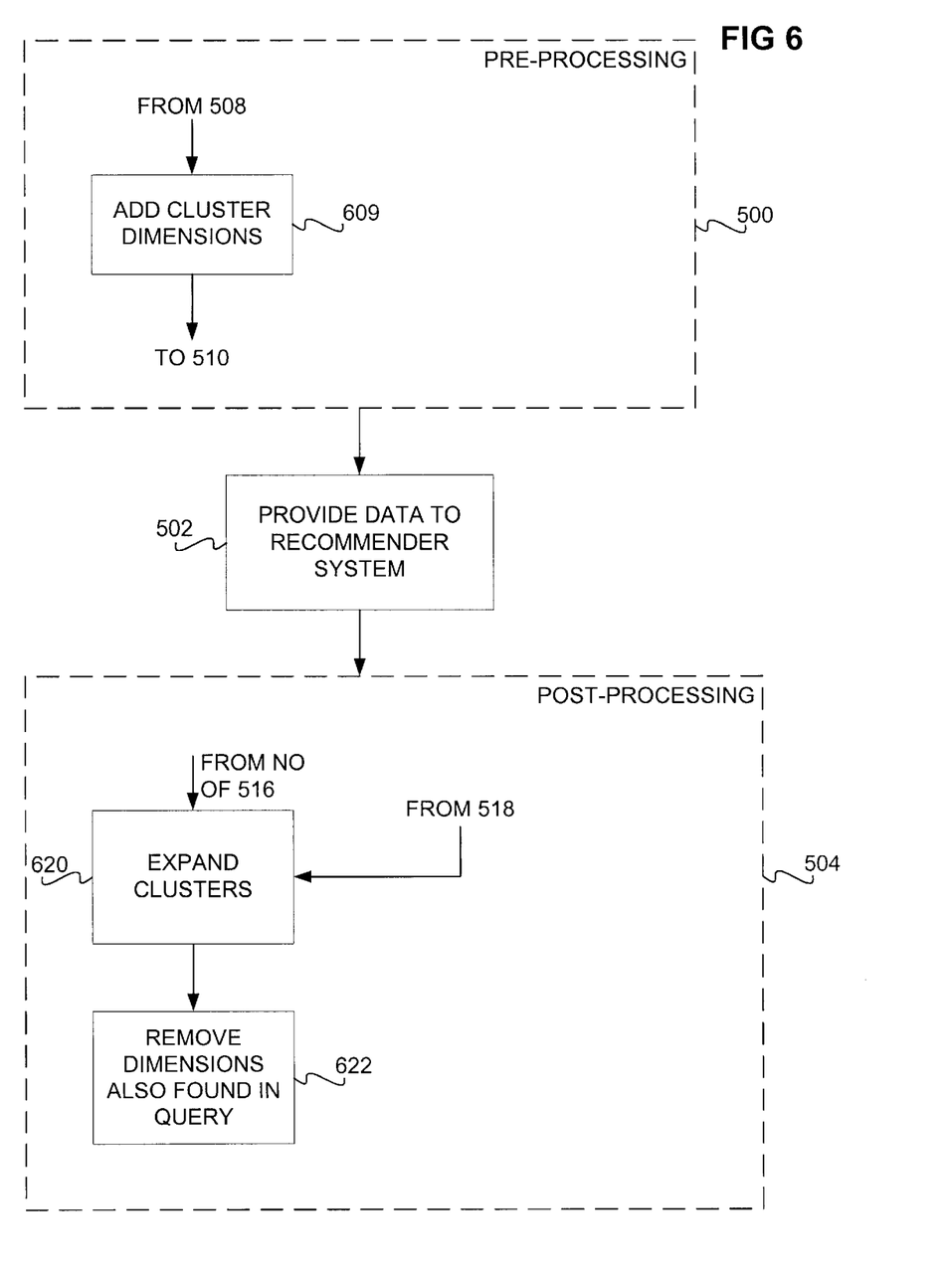

In this section of the detailed description, the manner by which recommender systems are retrofitted in accordance with another embodiment of the invention—specifically a cluster-based embodiment—is described. The invention itself is not particularly limited to this embodiment, however. The embodiment is described as a method, which can be a computer-implemented method, and is shown in the flowchart of FIG. 6, to which reference is made. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Referring now to FIG. 6, a flowchart of a method according to a cluster-based embodiment of the invention is shown. It is noted that the method of FIG. 6 is based on the method that has been described in the previous section of the detailed description in conjunction with FIG. 5. That is, the method of FIG. 6 adds further pre-processing in 500 and further post-processing in 504 to that already performed in the method of FIG. 5. Therefore, description of the cluster-based embodiment herein shows the manner by which the method of FIG. 5 can be augmented to attain the cluster-based approach to retrofitting a recommender system.

Specifically, in the pre-processing of 500, between 508 and 510, cluster dimensions are added in 609. In one embodiment, the data is or has been clustered, in accordance with a clustering technique known within the art, such that the records of the data are clustered, where each record belongs to a cluster. Each cluster includes a number of constituent dimensions. A dimension is added to the data to correspond to each cluster. Each record receives by default a binary "no" value (0 value) for each dimension, except for the dimension to which the record belongs, in which case the record has a binary "yes" value (1 value) for this dimension. In another embodiment of the invention, the query itself is also clustered, such that the query is modified to include the dimension corresponding to the cluster to which the query belongs.

Once the data has been completely pre-processed in 500, including the clustering of 609, the method of FIG. 6 proceeds as before, to 502, where the recommender generates predictions based on the query and the data as pre-processed. It is noted that the cluster dimensions added to the data, and optionally to the query, are treated by the recommender no different than the dimensions already existing in the data. That is, to the recommender, the added cluster dimensions are just dimensions, corresponding to, for example, items just like the other dimension may correspond to items. The recommender does not know that the dimensions added actually correspond to clusters.

The post-processing in 504 is performed as has been described previously in conjunction with FIG. 5, except that 620 and 622 are also performed from the "no" path of 516, and after 518. That is, 620 and 622 are performed in lieu of 520 of FIG. 5. In 620, if any dimensions within the predictions correspond to clusters (i.e., are cluster dimensions), then these clusters are expanded to their constituent non-cluster-corresponding dimensions, so that the predictions do not include any dimensions that correspond to clusters, but only dimensions as were originally found in the data belonging to the corresponding cluster. In 622, any dimensions also found in the query itself are removed—for example, any dimensions that resulted from the expansion of cluster dimensions that also are in the query itself are removed. If the query itself had dimensions added thereto corresponding to clusters in 609, then in 622, any dimension within the predictions that is also found as a dimension distributed within the cluster added as a dimension to the query is also removed. The method of FIG. 6 ends at 622.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method for retrofitting a recommender system to accommodate voluminous data organized into records having dimensions comprising:

pre-processing the data by reducing the number of records to provide pre-processed data such that both a predetermined accuracy threshold and a predetermined performance requirement are met; wherein reducing the data by the number of records is stopped specifically as a result of meeting a predetermined accuracy threshold, and pre-processing further comprises repeatedly removing a highest-frequency dimension from the data until the predetermined performance requirement is met; and, providing the pre-processed data to the recommender system to generate predictions based on a query and the pre-processed data as reduced in pre-processing.

2. The method of claim 1, further comprising post-processing the predictions to account for the fact that the recommender system generates predictions based on the data as reduced in pre-processing rather than the data itself.

3. The method of claim 1, wherein the method further comprises post-processing the predictions by adding each dimension previously removed from the data during preprocessing to the predictions upon determining that the dimension is mutually exclusive with dimensions of the query.

4. The method of claim 1, wherein pre-processing the data further comprises adding dimensions to the data corresponding to a plurality of clusters over the data, where each record resides in one of the clusters.

5. A computer-implemented method for retrofitting a recommender system to accommodate voluminous data that is organized into records and dimensions comprising:
 a) pre-processing the data by
  i) adding dimensions to the data corresponding to a plurality of clusters over the data, where each record resides in one of the clusters;
  ii) reducing the data and evaluating both a predetermined accuracy threshold and a predetermined performance requirement;
  iii) continuing to reduce the data by a number of records until the predetermined accuracy threshold is met; and
  iv) repeatedly removing a highest-frequency non-cluster-corresponding dimension from the data until the predetermined performance requirement is met; and,
 b) providing the data as reduced in pre-processing to the recommender system to generate predictions based on a query and the data as reduced in pre-processing.

6. The method of claim 5, wherein the method further comprises post-processing the predictions by adding each dimension previously removed from the data during pre-processing to the predictions upon determining that dimension is mutually exclusive with dimension of the query.

7. A computer-implemented method for retrofitting a recommender system to accommodate voluminous data that is organized into records and dimensions comprising:
 a) pre-processing the data by
  i) adding dimensions to the data and a query to be processed, said dimensions corresponding to a plurality of clusters over the data, where each record and said query resides in one of the clusters;
  ii) reducing the data and evaluating both a predetermined accuracy threshold and a predetermined performance requirement;
  iii) repeatedly reducing the data by a number of records until one of the predetermined accuracy threshold and the predetermined performance requirement is first met; and
  iv) adding as a dimension to the query a cluster to which the query belongs and,
 b) providing the data as reduced in pre-processing to the recommender system to generate predictions based on a query and the data as reduced in pre-processing.

8. The method of claim 7, wherein the method further comprises post-processing the predictions by expanding each dimension of the predictions corresponding to a cluster to a plurality of dimensions distributed in the cluster, removing each dimension from the predictions that is also found in the query, and removing each dimension from the predictions that is also found as a dimension distributed within the cluster added as a dimension to the query.

9. A computer-implemented method for retrofitting a recommender system to accommodate voluminous data organized into records having dimensions comprising:
 pre-processing the data by reducing the number of records to provide pre-processed data such that both a predetermined accuracy threshold and a predetermined performance requirement are met; wherein pre-processing the data comprises repeatedly reducing the data by a number of records until one of the predetermined accuracy threshold and the predetermined performance requirement is first met; wherein pre-processing the data further comprises adding dimensions to the data corresponding to a plurality of clusters over the data, where each record resides in one of the clusters;
 providing the pre-processed data to the recommender system to generate predictions based on a query and the pre-processed data as reduced in pre-processing;
 and post-processing the predictions by expanding each dimension of the predictions corresponding to a cluster to a plurality of dimensions distributed in the cluster, and removing each dimension from the predictions that is also found in the query.

10. A machine-readable medium having instructions stored thereon for execution by a processor to perform a method for retrofitting a recommender system comprising:
 repeatedly reducing data organized into records and dimensions by a number of records until one of a predetermined accuracy threshold and a predetermined performance requirement is first met;
 upon first meeting the predetermined accuracy threshold, repeating removing a highest-frequency dimension from the data until the predetermined performance requirement is also met;
 providing the data wherein at least one of records and dimensions have been removed therefrom to the recommender system to generate predictions also based on a query; and,
 adding any dimension previously removed from the data to also meet the predetermined performance requirement to the predictions upon determining that the dimension is mutually exclusive with dimensions of the query.

11. The medium of claim 10, wherein the method further comprises, after repeatedly reducing data, adding dimensions to the data corresponding to a plurality of clusters over the data, where each record resides in one of the clusters.

12. The medium of claim 11, wherein repeatedly removing a highest-frequency dimension from the data until the predetermined performance requirement is also met comprises repeatedly removing a highest-frequency non-cluster-corresponding dimension from the data until the predetermined performance requirement is met.

13. The medium of claim 12, wherein the method further comprises expanding any dimension of the predictions corresponding to a cluster to a plurality of dimensions distributed in the cluster, and removing any dimension from the predictions that is also found in the query.

14. The medium of claim 11, wherein the method further comprises adding as a dimension to the query a cluster to which the query belongs.

15. The medium of claim 14, wherein the method further comprises expanding any dimension of the predictions corresponding to a cluster to a plurality of dimensions distributed in the cluster, removing any dimension from the predictions that is also found in the query, and removing any dimension from the predictions that is also found as a dimension distributed within the cluster added as a dimension to the query.

16. A machine-readable medium having instructions stored thereon for execution by a processor to perform a method for retrofitting a recommender system comprising:

repeatedly reducing data organized into records and dimensions by a number of records until one of a predetermined accuracy threshold and a predetermined performance requirement is first met;

adding dimensions to the data corresponding to a plurality of clusters over the data, where each record resides in one of the clusters;

upon first meeting the predetermined accuracy threshold, repeatedly removing a highest-frequency non-cluster-corresponding dimension from the data until the predetermined performance requirement is also met;

providing the data as at least one of records and dimensions have been removed to the recommender system to generate predictions also based on a query;

adding any dimension previously removed from the data to also meet the predetermined performance requirement to the predictions upon determining that the dimension is mutually exclusive with dimensions of the query; and, expanding any dimension of the predictions corresponding to a cluster to a plurality of dimensions distributed in the cluster, and removing any dimension from the predictions that is also found in the query.

17. The medium of claim 16, wherein the method further comprises adding as a dimension to the query a cluster to which the query belongs.

18. The medium of claim 17, wherein the method further comprises removing any dimension from the predictions that is also found as a dimension distributed within the cluster added as a dimension to the query.

19. A machine-readable medium having instructions stored thereon for execution by a processor to perform a method for retrofitting a recommender system comprising:

a) pre-processing the data by
  i) adding dimensions to the data corresponding to a plurality of clusters over the data, where each record resides in one of the clusters;
  ii) reducing the data and evaluating both a predetermined accuracy threshold and a predetermined performance requirement;
  iii) continuing to reduce the data by a number of records until the predetermined accuracy threshold is met; and
  iv) repeatedly removing a highest-frequency non-cluster-corresponding dimension from the data until the predetermined performance requirement is met; and, b) providing the data as reduced in pre-processing to the recommender system to generate predictions based on a query and the data as reduced in pre-processing.

20. The machine readable medium of claim 19 wherein the instructions further comprises post-processing the predictions by adding each dimension previously removed from the data during preprocessing to the predictions upon determining that the dimension is mutually exclusive with dimensions of the query.

* * * * *